US011626713B2

(12) United States Patent
Kozel et al.

(10) Patent No.: US 11,626,713 B2
(45) Date of Patent: Apr. 11, 2023

(54) SUBSTATION CONTAINING SWITCH-GEAR OR CONTROL-GEAR WITH UNMANNED OPERATION AND MAINTENANCE

(71) Applicant: ABB Schweiz AG, Baden (CH)

(72) Inventors: Tomas Kozel, Brno (CZ); Thomas Schmidtchen, Houston, TX (US); Martin Stefanka, Rajhrad (CZ)

(73) Assignee: ABB Schweiz AG, Baden (CH)

( * ) Notice: Subject to any disclaimer, the term of this patent is extended or adjusted under 35 U.S.C. 154(b) by 519 days.

(21) Appl. No.: 16/724,499

(22) Filed: Dec. 23, 2019

(65) Prior Publication Data
US 2020/0127448 A1 Apr. 23, 2020

Related U.S. Application Data
(63) Continuation of application No. PCT/EP2018/067484, filed on Jun. 28, 2018.

(30) Foreign Application Priority Data

Jun. 28, 2017 (EP) .................................... 17178336
Jun. 28, 2017 (EP) .................................... 17178385
(Continued)

(51) Int. Cl.
*B25J 9/16* (2006.01)
*B25J 11/00* (2006.01)
(Continued)

(52) U.S. Cl.
CPC ................. *H02B 3/00* (2013.01); *B25J 9/16* (2013.01); *B25J 11/005* (2013.01); *H02B 7/00* (2013.01);
(Continued)

(58) Field of Classification Search
CPC .............................. B25J 9/16; G05B 2219/39
See application file for complete search history.

(56) References Cited

U.S. PATENT DOCUMENTS

| 7,576,985 | B2* | 8/2009 | Kingston | ............. H02B 13/025 361/677 |
| 8,878,687 | B2* | 11/2014 | Shiraishi | .................. G01V 8/20 49/25 |

(Continued)

FOREIGN PATENT DOCUMENTS

| CN | 101303695 A | 11/2008 |
| CN | 101604825 A | 12/2009 |

(Continued)

OTHER PUBLICATIONS

Chen, "Electrical Design Manual for Intelligent Building," *China Building Materials Industry Press*, Book 2, 1115-1119 (Aug. 1999).
(Continued)

*Primary Examiner* — Kira Nguyen
(74) *Attorney, Agent, or Firm* — Leydig, Voit & Mayer, Ltd.

(57) ABSTRACT

A substation containing a switch-gear or control-gear system, in particular a switch-gear or control-gear system includes at least one low voltage switch-gear or control-gear, with unmanned operation and maintenance. The inner room, where the switch-gear or control-gear are located in, is hermetically enclosed by an outer housing, the switch-gear or control-gear system is provided for unmanned operation and maintenance with a robotic system or manipulator, and/or the robotic system or manipulator is provided with a camera system, and/or an image recognition system and/or the inner room is locked against the outer housing by an inner, automatically operated door, and/or the robot system is implemented in such, that the robot systems acting area is extended from the inner room, partly in the area outside the
(Continued)

inner room, but inside the outer housing, where spare parts are stored in a spare parts hand over area.

9 Claims, 3 Drawing Sheets

(30) Foreign Application Priority Data

Dec. 21, 2017 (EP) .................................... 17209473
Dec. 21, 2017 (EP) .................................... 17209512

(51) Int. Cl.
  *H02B 3/00* (2006.01)
  *H02B 7/00* (2006.01)
  *H02B 11/12* (2006.01)
(52) U.S. Cl.
  CPC .......... *H02B 11/12* (2013.01); *G05B 2219/39* (2013.01)

(56) References Cited

U.S. PATENT DOCUMENTS

| | | | |
|---|---|---|---|
| 10,744,124 | B2 | 8/2020 | Zaid et al. |
| 10,751,330 | B2 | 8/2020 | Zaid et al. |
| 2004/0176875 | A1 | 9/2004 | Iribe et al. |
| 2011/0067781 | A1 | 3/2011 | Osborne |
| 2013/0231779 | A1* | 9/2013 | Purkayastha ........ G05D 1/0088 700/258 |
| 2014/0362480 | A1* | 12/2014 | Veil ......................... H02H 3/26 361/18 |
| 2015/0364285 | A1 | 12/2015 | Shinde et al. |
| 2017/0085064 | A1* | 3/2017 | Cassimere ............... H02B 1/56 |
| 2020/0127446 | A1 | 4/2020 | Kozel et al. |
| 2020/0127447 | A1 | 4/2020 | Kozel et al. |
| 2020/0136357 | A1 | 4/2020 | Kozel et al. |
| 2020/0136358 | A1 | 4/2020 | Kozel et al. |
| 2020/0147061 | A1 | 5/2020 | Zaid et al. |
| 2020/0153210 | A1 | 5/2020 | Kozel et al. |
| 2020/0265572 | A1 | 8/2020 | Cole et al. |

FOREIGN PATENT DOCUMENTS

| | | |
|---|---|---|
| CN | 101692530 A | 4/2010 |
| CN | 102056581 A | 5/2011 |
| CN | 102122844 A | 7/2011 |
| CN | 102280826 A | 12/2011 |
| CN | 202333477 U | 7/2012 |
| CN | 202584339 U | 12/2012 |
| CN | 102856827 A | 1/2013 |
| CN | 202649815 U | 1/2013 |
| CN | 202678813 U | 1/2013 |
| CN | 203660309 U | 6/2014 |
| CN | 203788404 U | 8/2014 |
| CN | 104144325 A | 11/2014 |
| CN | 204012372 U | 12/2014 |
| CN | 104569912 A | 4/2015 |
| CN | 104660948 A | 5/2015 |
| CN | 104709826 A | 6/2015 |
| CN | 205021584 U | 2/2016 |
| CN | 105415380 A | 3/2016 |
| CN | 205206469 U | 5/2016 |
| CN | 205380658 U | 7/2016 |
| CN | 105881505 A | 8/2016 |
| CN | 105958344 A | 9/2016 |
| CN | 106003084 A | 10/2016 |
| CN | 106122731 A | 11/2016 |
| CN | 106165048 A | 11/2016 |
| CN | 106223775 A | 12/2016 |
| CN | 106340006 A | 1/2017 |
| CN | 205944755 U | 2/2017 |
| CN | 106647569 A | 5/2017 |
| CN | 106856311 A | 6/2017 |
| EP | 3010101 A1 | 4/2016 |
| GB | 1524109 A | 9/1978 |
| JP | 59-160158 A | 9/1984 |
| JP | H 06233419 A | 8/1994 |
| JP | H 09130929 A | 5/1997 |
| JP | 2007172735 A | 7/2007 |
| KR | 10-1608325 B1 | 4/2016 |
| WO | WO 2015081455 A1 | 6/2015 |

OTHER PUBLICATIONS

Lu et al., "Mobile Robot for Power Substation Inspection: A Survey," *IEEE/CAA J. of Automatica Sinica* 4(4), 830-847 (Jan. 25, 2017).
Menéndez et al., "Robotics in Power Systems: Enabling a More Reliable and Safe Grid," *Industrial Electronics Magazine*, IEEE, 11(2), 22-34 (Jun. 23, 2017).
Toth et al., "Smart View for a Smart Grid—Unmanned Aerial Vehicles for Transmission Lines," *2010 1st International Conference on Applied Robotics for the Power Industry*, IEEE, 1-6 (Oct. 5-7, 2010).
Velrajkumar et al., "Development of Real-Time Tracking and Control Mobile Robot using Video Capturing Feature for Unmanned Applications," *2010 International Conference on Communication Control and Computing Technologies IEEE*, 90-92 (Oct. 7-9, 2010).
Jean-Francois Allan et al: "Robotic systems applied to power substations—A state-of-the-art survey", Proceedings of The 2014 3$^{rd}$ International Conference On Applied Robotics for the Power Industry. Jan. 1, 2014 (Jan. 1, 2014), pp. 1-6, XP055471456.
Terence Hazel et al: "IEC switchgear & controlgear—internal arc withstand a designer's and user's view", PCIC Europe 2013, Jun. 1, 2011 (Jun. 1, 2011), pp. 1-12, XP055514149.
Li et al., "Industrial Robot Installation and Commissioning Tutorial," Textbook for Industrial Robot Professionals under the 13th Five-Year Plan, *Beihang Univ. Press*, Beijing, China, 26 pp. (Nov. 2016).
Liu et al., "Robotics Fundamentals," *Metallurgical Industry Press*, Beijing, China, 43 pp. (Nov. 2002).
U.S. Appl. No. 16/724,462, filed Dec. 23, 2019, Pending.
U.S. Appl. No. 16/724,479, filed Dec. 23, 2019, Pending.
U.S. Appl. No. 16/727,982, filed Dec. 27, 2019, Patented.
U.S. Appl. No. 16/727,996, filed Dec. 27, 2019, Pending.
U.S. Appl. No. 16/724,462, filed Dec. 23, 2019.
U.S. Appl. No. 16/724,479, filed Dec. 23, 2019.
U.S. Appl. No. 16/727,982, filed Dec. 27, 2019.
U.S. Appl. No. 16/727,996, filed Dec. 27, 2019.
China National Intellectual Property Administration, Decision to Grant in Chinese Patent Application No. 201880043602.1, 6 pp. (dated Dec. 5, 2022).

* cited by examiner

SUBSTATION CONTAINING SWITCH-GEAR OR CONTROL-GEAR WITH UNMANNED OPERATION AND MAINTENANCE

CROSS-REFERENCE TO PRIOR APPLICATIONS

This application is a continuation of International Patent Application No. PCT/EP2018/067484, filed on Jun. 28, 2018, which claims priority to European Patent Application Nos. EP 17178336.8, filed on Jun. 28, 2017, EP 17178385.5, filed on Jun. 28, 2017, EP 17209473.2, filed on Dec. 21, 2017, and EP 17209512.7, filed on Dec. 21, 2017. The entire disclosure of all the prior applications is hereby incorporated by reference herein.

FIELD

The invention relates to a substation containing switch-gear or control-gear.

BACKGROUND

The switch-gear or control-gear with unmanned operation and maintenance excludes human operators from operation and maintenance processes of the switch-gear or control-gear as we know them today. So far systems like that are automized, nevertheless, the entrance for human operators has to be restricted, when primary circuits are energized.

SUMMARY

In an embodiment, the present invention provides a substation containing a switch-gear or control-gear system, in particular a switch-gear or control-gear system including at least one low voltage switch-gear or control-gear, with unmanned operation and maintenance. The inner room, where the switch-gear or control-gear are located in, is hermetically enclosed by an outer housing, the switch-gear or control-gear system is provided for unmanned operation and maintenance with a robotic system or manipulator, and/or the robotic system or manipulator is provided with a camera system, and/or an image recognition system and/or the inner room is locked against the outer housing by an inner, automatically operated door, and/or the robot system is implemented in such, that the robot systems acting area is extended from the inner room, partly in the area outside the inner room, but inside the outer housing, where spare parts are stored in a spare parts hand over area.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
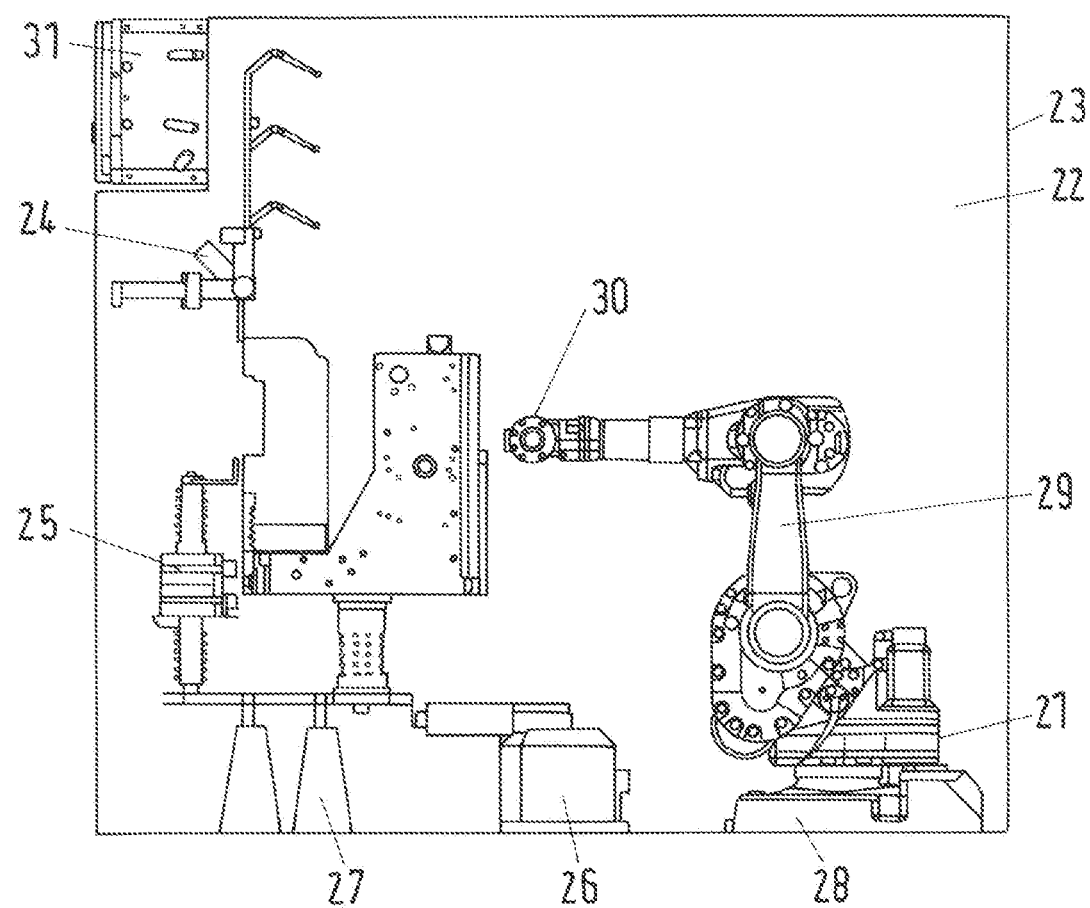
FIG. 1 is a crossection of switch-gear or control-gear with unmanned operation and maintenance, according to an embodiment.

An object of an embodiment is to proceed the operating and/or maintenance of such substations in an automized way, and just in case of further need of human operator, to enhance security for the human operator.

First, the aforesaid substation is operated automatically. For that, a robot system is used, to operate inside an operation room where the switch-gear or the control-gear system, in particular a low voltage switch-gear or control-gear system, is located in, and which is implemented inside the outer housing.

Therefore further several sensor means located in the area between the inner room of inner housing, and the outer housing, and/or at the door of the outer housing, which are able to detect the entrance of a human operator.

Referring to a switch-gear or control-gear system, one aspect of an embodiment of the invention is, that the switch-gear or control-gear system, in particular the low voltage switch-gear or control-gear system and/or comprising one or more withdrawable modules, is provided for unmanned operation and maintenance with a robotic system or manipulator, and that the robotic system or manipulator is provided with a camera system, and an image recognition system.

Furthermore, adding a robotic system to inner space of the switch-gear or control-gear, a new system serving the operation and maintenance functions of the switch-gear or control-gear was introduced.

The robotic system and design of the switch-gear or control-gear internal space, in particular without further segregations gives opportunity to collect much richer static and dynamic visual data about the primary and auxiliary circuits and mechanisms condition compared to today situation.

Collected rich visual data allow the application of automatized image processing and analysis with the target to learn the conditions of the switch-gear or control-gear systems and components.

Furthermore, by the use of an embodiment of the invention, the switch-gear or control-gear systems can react in cases of faults much quicker, and more effectively.

A further advantageous embodiment is, that the robot system is provided with a data network or an external data communication interface.

In a further advantageous embodiment the camera has means for corresponding with a image recognition system, and to evaluate actual images with adaptive image data, in order to be able to locate and to analyse physical reasons for faults, or deterioration of components, that might lead to faults.

In a further advantageous embodiment, the camera is provided with a video mode, by which the functional surveillance can be taken by slow motion video sequences.

In a further embodiment the robotic system or manipulator is provided with a tool changing system, which may be used to change/switch between various tools for maintenance and service activities, in particular for detaching or attaching and/or exchanging switch-gear or control-gear components, like for example withrawable modules and/or module components, connectors and the like, in an automated way.

Exemplary tools may be for example a gripper and/or screwdriver.

Furthermore, a tool storage may be provided to store and provide the various tools for the tool changing system of the robotic system or manipulator.

Concerning a method for operating such a switch-gear or control-gear, an embodiment of the invention is, that the switch-gear or control-gear system, in particular the low voltage switch-gear or control-gear system is provided for unmanned operation and maintenance with a robotic system or manipulator, which is steered and/or controlled at least partly by a software system, and that the robotic system or manipulator is provided with a camera system, and an image recognition system, which is corresponding for technical diagnosis.

In a further embodiment the voltage switch-gear or control-gear system comprises an external housing and is provided for unmanned operation and maintenance with a robotic system or manipulator, wherein the robotic system or manipulator is provided with a camera and an image recognition system, which is corresponding for technical diagnosis.

Furthermore, the robotic system or manipulator may be steered and/or controled at least partly by a housing internal and/or a housing external software system.

In a further advantageous embodiment of the invention, the robot system is provided with a data network or external data communication interface, and that in case of detection of technical problems or malfunctions, referring messages are generated automatically and sent to an authorized external observation system.

Furthermore advantageous is an embodiment, in which the camera is provided with means for corresponding with an image recognition system, and to evaluate actual images with adaptive image data, in order to be able to locate and to analyse physical reasons for faults or deterioration of components that might lead to faults.

In an advantageous embodiment, the camera is provided with a video mode, by which the functional surveillance can be taken by slow motion video sequences, and analysed automatically with regular expected function sequences by comparison of slow motion video sequences from a adaptive data field, which show the expected regular function.

A further important consequent feature of an embodiment of the invention is, that if the inner room is automatically restricted by inner door locking when current carrying parts are energized, the switch-gear or control-gear don't need a further compartment.

The robotic system of the switch-gear or the control-gear, in particular the low voltage switch-gear or control-gear, with unmanned operation and maintenance can require maintenance and spare parts sourcing. The robotic system is inaccessible by human inside the switch-gear or control-gear outer housing when the primary circuits are energized.

By adding the robotic system to inner space or room of the switch-gear or control-gear, a new complex system was however introduced into the switch-gear or control-gear and this system would require maintenance itself. Another feature is, that the robotic system can get spare parts for the switch-gear or control-gear maintenance. Even though the human interactions with the switch-gear or control-gear can be much less frequent in comparison to current practices, the human operator safety interlocks for the switch-gear or control-gear with unmanned operation and maintenance must be defined.

In a further embodiment the robotic system is provided with a tool changing system, which may be used to change/switch between various tools for maintenance and service activities, in particular for detaching or attaching and/or exchanging switch-gear or control-gear components, like for example withrawable modules and/or module components, connectors and the like, in an at least partly automated way. Exemplary tools may be for example a gripper and/or screwdriver.

Furthermore, a tool storage may be provided to store and provide the various tools for the tool changing system of the robotic system or manipulator.

In a further advantageous embodiment, human operator presence sensors are implemented inside the room of the outer housing, in such, that if current carrying parts inside the inner room, where the switch-gear or control-gear are located, are energized, locking means at the door of the inner room automatically lock that door, where inside the inner room only the robot system is allowed to operate.

In a further advantageous embodiment, the inner room is as well a hermetically closable compartment.

By that it is possible, that inside this inner compartment of the substation, the switch-gear as such need no further enclosure itself, because it is secured against entrance of human operator by the locked door, in case of energized current carrying parts.

According to the method of operating such a substation, the inner room is locked against the outer housing by an inner, automatically operated door, and that locking and de-locking of that door is logically controlled by evaluation of an automatic sensoring of the presence of human operator and the energy status on current carrying parts of the switch-gear or control-gear and/or the busbars, and that a robot system is implemented in such, that the robot systems acting area is extended from in the inner room, partly in the area outside the inner room, but inside the outer housing, where spare parts are stored in a spare parts hand over area, for maintenance.

An advantageous method for maintenance is, that for maintenance or repair of the robot, an area is predefined as repair and maintenance area, which is located outside the inner room and inside the outer housing, where human operator is allowed to enter, if the inner room, where the switch-gear or control-gear of the inner room are energized, is locked by the door of the inner room. By that, high requirements for human operators safety is given.

An advantageous embodiment of the invention is shown in the drawings.

Figure 2:
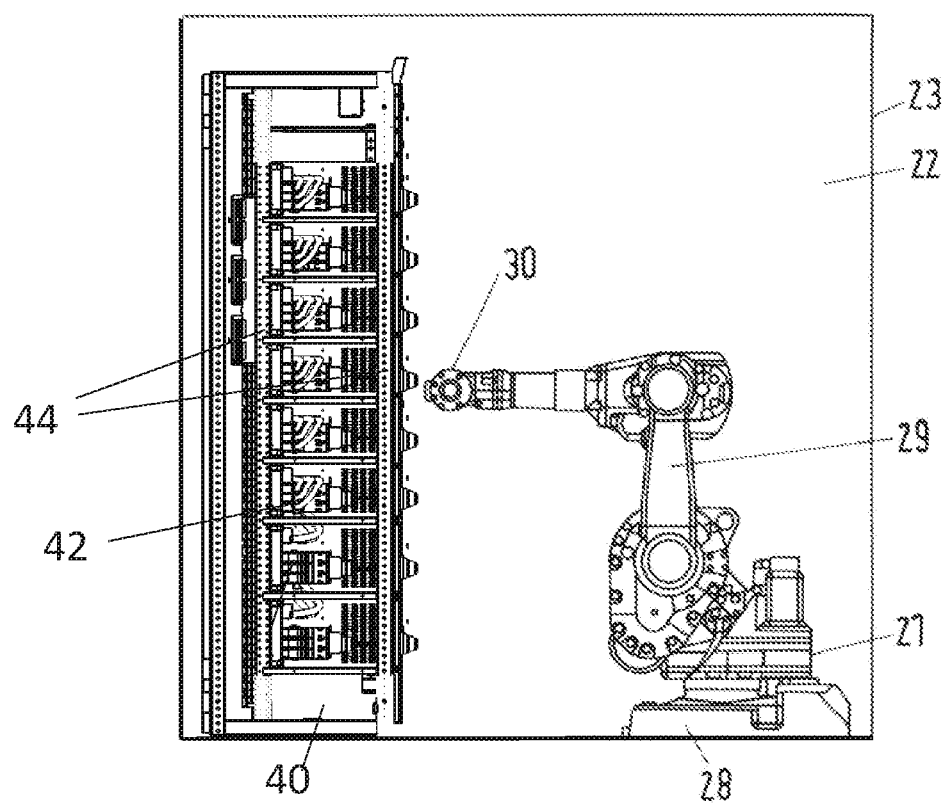
FIG. 2 is a crossection of a low voltage switch-gear or control-gear with unmanned operation and maintenance, according to an embodiment.

FIG. 1 and FIG. 2 show exemplary embodiments of switch-gear or control-gear with unmanned operation and maintenance.

In FIG. 2 an exemplary low voltage switch-gear or control-gear with unmanned operation and maintenance is disclosed. The low voltage switch-gear 40 comprises a mounting frame 44 and/or several withdrawable modules 42.

In the presented embodiment of FIG. 1 and FIG. 2 the robotic system 21 tooling may include in this embodiment sensors for visual inspection and thermographic inspection for the enhanced inspection of energized switch-gear or control-gear.

As the robotic manipulator 29 and wrist 30 is allowed to approach de-energized circuits only, all these sensors can be non-contact type. The robotic arm and wrist can position the sensors to best shot positions without advanced pan, tilt, zoom functions on the sensors itself.

The visual inspection sensor in this embodiment is be capable of taking high resolution picture as well as slow-motion video sequence recording. The data from visual inspection sensor and subsequent automatic image analysis algorithms can be used for following inspection tasks:
- Detecting grime, corrosion, moisture on the primary circuits from high resolution static images
- Detecting traces of discharges or ruptures on the insulation surfaces from high resolution static images
- Detecting irregularities in movement of auxiliary mechanism during operation by slow-motion video sequence analysis
- Detecting irregularities in movement of switching device moving contact by slow-motion video sequence analysis The sensors for thermographic inspection can be capable of taking high resolution thermographic pictures of high emissivity surfaces. The primary circuits inside the switch-gear or control-gear can be preferably covered with thin high emissivity material wherever possible to allow accurate thermographic measurements.

The data from thermographic inspection sensor and subsequent automatic image analysis algorithms can be used for following inspection tasks:
- Detecting hot spots on primary circuits from static thermographic images
- Detecting spots hotter than maximum allowed temperature on the primary circuits from static thermographic images
- Detecting hot spots on the auxiliary circuits from static thermography images
- Detecting points of high friction on the auxiliary mechanisms from static thermography images In an embodiment, there are two options for accessing the robotic system and supplying the spare parts for the switch-gear or control-gear:
- either all primary circuits of the switch-gear or control-gear have to be completely de-energized to make the switch-gear or control-gear internal space 22 safe for human access, or
- the robotic system 21 has to be allowed to get out of the switch-gear or control-gear outer housing 23 for interaction if necessary.

Figure 3:
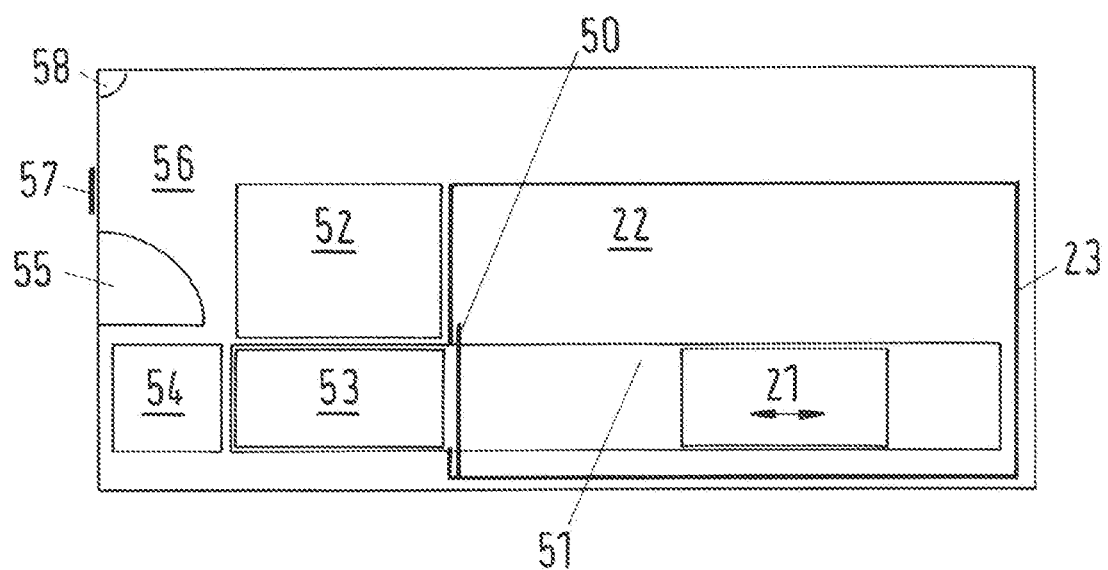
FIG. 3 is an example of the substation floor plan and location of the human-machine interfaces for a switch-gear or control-gear with unmanned operation, according to an embodiment.

The second option is more desirable with respect to the switch-gear or control-gear service continuity and uptime. To allow robotic system 21 movement out of the enclosure a dedicated door 50 on the switch-gear or control-gear outer housing 23 are suggested—see FIG. 3.

The doors are arc proof when closed and dimensioned to allow passing of the robotic system with docked manipulator through. The door open only for the period needed for the robot moving through, they are closed for the rest of the time. The door are preferably located on one lateral side of the switch-gear or control-gear to allow predefined robotic movement area 51 to be as simple and narrow as possible.

The robotic system predefined movement area 51 is extended out of the switch-gear or control-gear outer housing 23. The default robotic system position is inside the switch-gear or control-gear outer housing 23 where it fullfills its tasks.

During the short period of robot moving through opened door 50 the arc proof enclosure 23 of the switch-gear or control-gear is compromised. Human personnel safety can be ensured at that time by making sure no operator is in the substation internal space 56 before opening the switch-gear or control-gear door 50. An interlocking system for the switch-gear or control-gear door 50 can be applied preventing its opening in following cases:
- An operator is present in the substation internal space 56 or robot repair area 54
- The door to substation 55 are opened The operator presence in the substation can be learned by one or combination of following systems:
- Person presence detection system based on human presence sensors 58
- Manually triggered electrical or mechanical interlock activated by operator before entry at the external substation interface 57. The interlock unlocks the substation door 55 and at the same time locks the switch-gear or control-gear door 50.

Another interlocking system acting in the human safety assurance can be applied to the substation entry door 55 preventing opening of the substation entry door from outside in case the switch-gear or control-gear door 50 are not positively confirmed closed and locked against opening. Activation of this interlock can be clearly signalled on the local external substation interface 57 for the operator to know the substation entry door 55 are interlocked.

The local external substation interface 57 can provide interface for local commands by operator, who is prepared to enter the substation or who is leaving the substation and local signalization of the switch-gear or control-gear status.

The available commands for robotic system can be as a minimum:
- Stay in the internal switch-gear or control-gear area 22 and lock the switch-gear or control-gear door 50 as a human operator is going to enter the substation for spare parts handling or other tasks where robot can stay inside the switch-gear or control-gear
- Get out to human-machine interaction area 53, lock the switch-gear or control-gear door 50 and stay docked as a human operator is going to enter the substation for maintenance or repair job on the robotic system
- All clear-operate freely as no human is inside the substation The local external substation interface can be in form of an intelligent electronic device, group of switches or key exchange box or combination of these devices.

Furthermore, a tool storage may be provided within the outer housing 23 to store and provide various tools for the tool changing system of the robotic system to execute maintenance and/or service activities.

To further enhance the human operator safety, two special areas with restricted acess can be defined as follows:
- spare parts handover area 52
- robot repair area 54

The spare parts handover area 52 can be built as spare parts storage area, where robot autonomously takes needed spare parts and stores replaced parts. The human-machine interaction in this area is indirect, a human is allowed to operate in this area only if robot is not in the human-machine interaction position 53. Human personnel tasks are removing the replaced parts and filling in fresh spare parts in case the stock is used up. The human unauthorized operation in this area is prevented preferably by fencing or enclosure with lock. The lock allows access only if the robotic system is inside the switch-gear or control-gear enclosure 23 and the switch-gear or control-gear door 50 are locked.

The robot repair area 54 is an area, which is designed for human operator performing the robot repair or maintenance. The robot repair area can be designed so, that with the manipulator docked the human operator can access all points of robot maintenance or repair. It can be safe to run a robot operation routine checks when operator is inside the robot repair area. The repair area is protected against unauthorized entry preferably by fencing or enclosure with lock. The lock allows entry only when robot is in human-machine interaction area 53 with docked manipulator ready for maintenance intervention and the switch-gear or control-gear door 50 are locked.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMBERS 21 robotic system, robot
22 space, inner room
23 outer housing, arc close
40 low voltage switch-gear
42 withdrawable module
44 mounting frame
50 door, automatic door
51 movement area
52 spare parts hand over area
53 interaction area
54 robot repair area
55 substation entry door, outer door
56 room in the outer housing
57 external substation interface

What is claimed is:

1. A substation, comprising:
an outer housing including an internal space; and
a switch-gear or control-gear system comprising at least one low voltage switch-gear or control-gear with unmanned operation and maintenance,
wherein an inner room, where the switch-gear or control-gear are located, is hermetically enclosed by an arc proof enclosure,
wherein the switch-gear or control-gear system is provided for unmanned operation and maintenance with a robotic system or manipulator,
wherein the robotic system or manipulator is provided with a camera system and/or an image recognition system,
wherein the inner room is configured to lock the internal space using an inner, automatically operated door,
wherein an acting area of the robot system extends from the inner room, and partly in an area outside the inner room, but inside the outer housing, where spare parts are stored in a spare parts hand over area, and
wherein human operator presence sensors are disposed inside the internal space of the outer housing such that if current carrying parts inside the inner room, where the switch-gear or control-gear are located, are energized, a lock at an inner, automatically operated door automatically locks so that inside the inner room only the robotic system is allowed to operate.

2. The substation according to claim 1, wherein spare parts are stored in a spare parts hand over area, for maintenance.

3. The substation according to claim 1, further comprising:
a tool storage for storing and providing various tools for a tool changing system of the robotic system or manipulator.

4. The substation according to claim 1, wherein the at least one low voltage switch-gear or control-gear comprises one or more withdrawable modules.

5. A method for operating a substation containing switch-gear or control-gear, in particular at least one low voltage switch-gear or control-gear, with unmanned operation, comprising:
logically controlling a locking and/or a de-locking of a door by evaluation of an automatic sensing of a presence of a human operator and an energizing status of current carrying parts of the switch-gear.

6. The method according to claim 5, wherein for maintenance or repair of the robot, an area is predefined as a repair and maintenance area, which is located outside an inner room and inside an outer housing and where the human operator is not allowed to enter, if the inner room, where the switch-gear or control-gear of the inner room are energized, is locked by the door.

7. A switch-gear or control-gear system, in particular a low voltage switch-gear or control-gear system, with unmanned operation and maintenance, comprising:
a robotic system or manipulator comprising a camera system and an image recognition system;
switch-gear or control-gear for unmanned operation and maintenance with the robotic system or manipulator; and
human operator presence sensors,
wherein, upon energization of current carrying parts of the switch-gear or control-gear, the system is configured to automatically lock a door so as to allow operation of the robotic system or manipulator.

8. The switch-gear or control-gear system according to claim 7, wherein the at least one low voltage switch-gear or control-gear comprises one or more withdrawable modules.

9. A method for operating a switch-gear or control-gear system, in particular a low voltage switch-gear or control-gear system with unmanned operation and maintenance, comprising:

providing a robotic system or manipulator comprising a camera system and an image recognition system for technical diagnosis;

providing switch-gear or control-gear for unmanned operation and maintenance with the robotic system or manipulator;

steering the robotic system or manipulator at least partly by a software system;

providing human operator presence sensors; and upon energization of current carrying parts of the switch-gear or control gear, automatically locking a door so as to allow operation of the robotic system or manipulator.

\* \* \* \* \*